June 24, 1958 L. W. ATCHISON ET AL 2,840,667
ELECTRIC SWITCH AND THERMOSTAT CONTROL
Filed Oct. 15, 1956 2 Sheets-Sheet 1
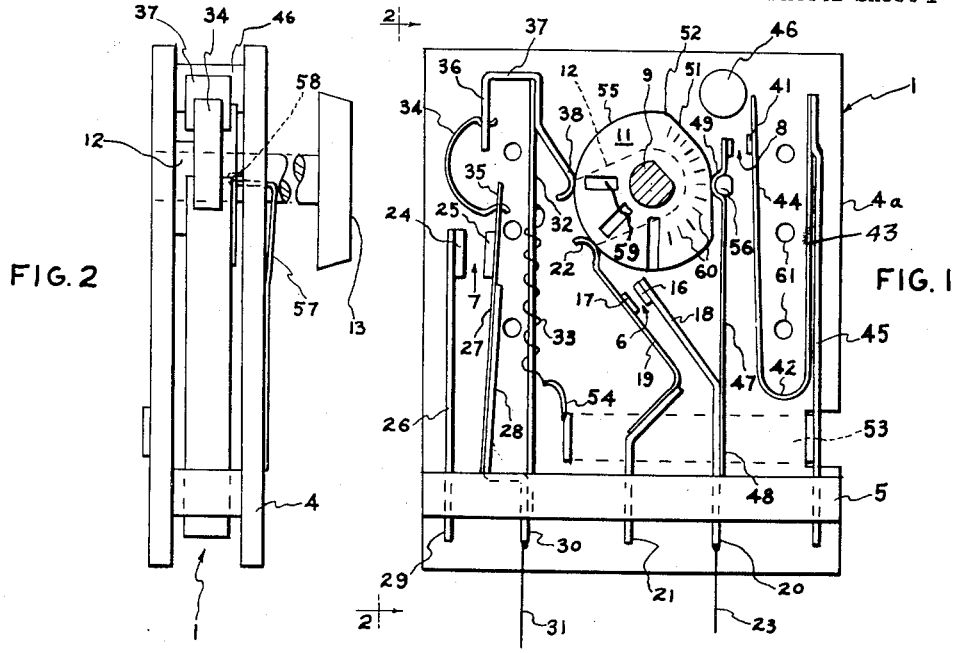
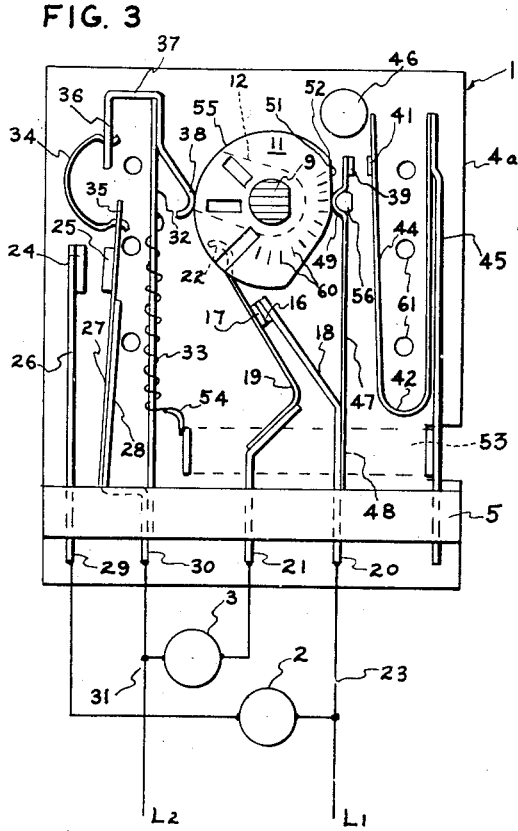
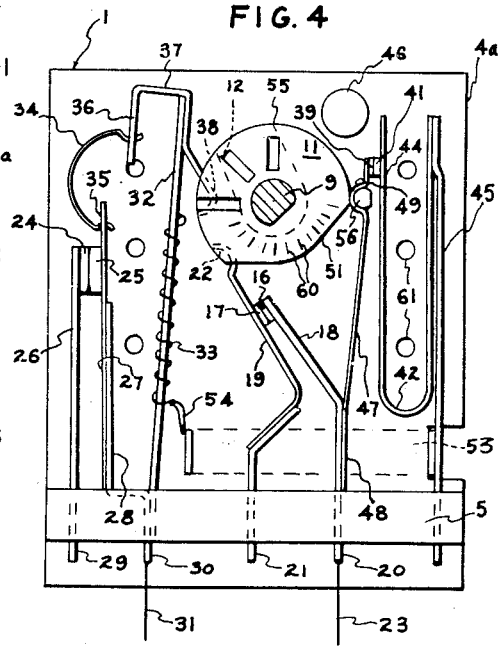
INVENTOR.
LEONARD W. ATCHISON
& EDWARD A. ZUERCHER, JR
BY *Ferd L. Mehlhoff*
THEIR ATTORNEY June 24, 1958   L. W. ATCHISON ET AL   2,840,667
ELECTRIC SWITCH AND THERMOSTAT CONTROL
Filed Oct. 15, 1956   2 Sheets-Sheet 2
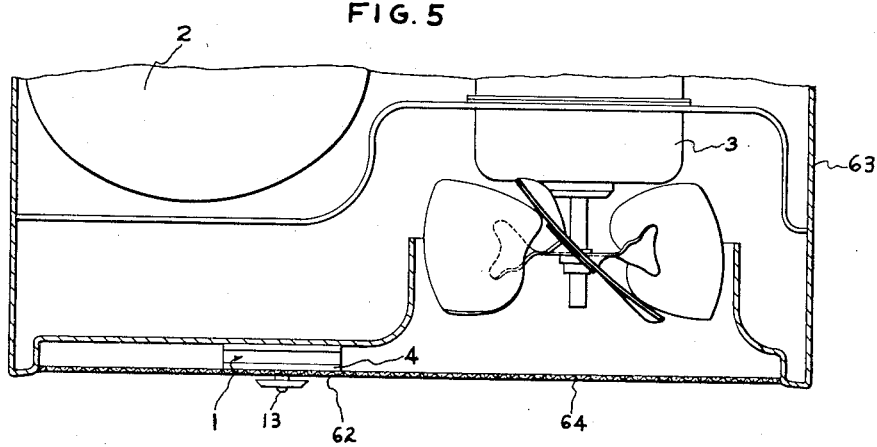
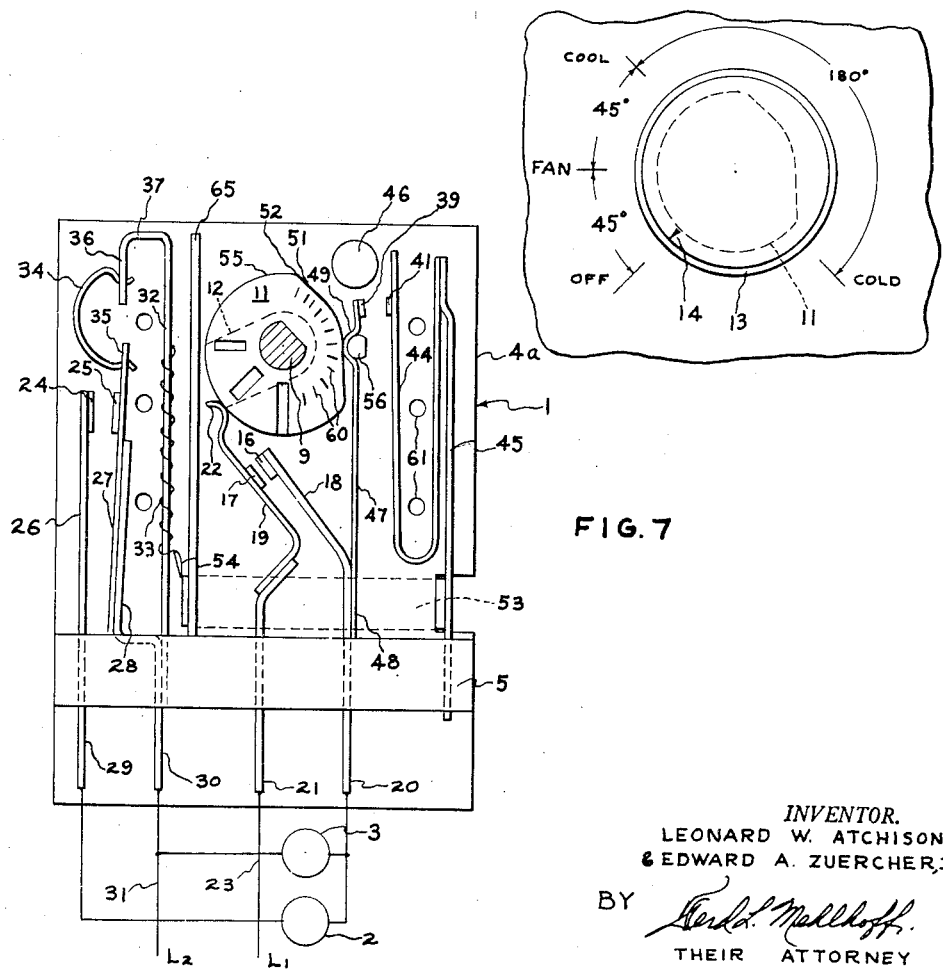
INVENTOR.
LEONARD W. ATCHISON
& EDWARD A. ZUERCHER, JR
BY
THEIR ATTORNEY United States Patent Office 2,840,667
Patented June 24, 1958

2,840,667
ELECTRIC SWITCH AND THERMOSTAT CONTROL

Leonard W. Atchison and Edward A. Zuercher, Jr., Louisville, Ky., assignors to General Electric Company, a corporation of New York Application October 15, 1956, Serial No. 615,790

3 Claims. (Cl. 200—122)

The present invention relates to a switch and thermostat control and more particularly to a manually operated switch mechanism for selectively controlling the energization of a plurality of electrical circuits as well as for adjusting the temperature setting of a thermostat element.

While the application of the invention is not limited thereto, it will be particularly described with reference to the control of the operation of a room air conditioning apparatus. The electrically operated elements incorporated in an apparatus of this kind usually include a motor driven fan for circulating air, a motor driven air cooling means, and a thermostat or temperature sensing control element for maintaining the air within the enclosure to be conditioned at a particular temperature. The fan and air cooling means are normally provided with separate electrical circuits which are connected to a control switch or a plurality of control switches for energizing each circuit separately. Many air conditioners also include a plurality of other electrically operated devices such as heaters, electrical defrosters, and extra motors for operating vents, and these devices are normally wired into separate electrical circuits and connected to separate control switches of some type. It is desirable to control the energization of these circuits with a single control member, and at times in order to provide certain conditioning effects, it is desirable to operate only one or two of these elements while the others remain inoperative. It is also desirable, from the peak starting load standpoint on the power lines leading to the air conditioner, to have the various electrical devices energized in sequence rather than simultaneously.

It is an object of this invention to provide an improved control mechanism for effecting operation of various electrical elements which mechanism also provides a means for adjusting a temperature controlling thermostat.

It is another object of this invention to provide an improved switch mechanism for sequentially energizing a plurality of electrical circuits.

It is a further object of this invention to provide an improved switch and thermostat control mechanism which sequentially energizes one electrical circuit and provides means for adjusting the setting of a temperature responsive device which in turn effects energization of a second circuit.

More specifically, it is an object of the present invention to provide a single manually operated means for an air conditioning apparatus for both controlling the operation of all the electrical components of the conditioner and adjusting the temperature setting of the thermostat which controls the operation of the air cooling components of the conditioner.

Further objects and advantages of the invention will become apparent as the following description proceeds and the features of novelty which characterize the invention will be pointed out with particularity in the claims annexed to and forming a part of this specification.

In carrying out the present invention there is provided a mechanism having first and second electrical switches and an adjustable thermostat. Means associated with the temperature sensing element of this thermostat are provided for actuating the second switch into a closed position according to a variable temperature condition. A single control member is provided movable from a first position, in which it prevents the actuation of either electrical switch, to a second position in which it actuates the first switch and prevents the actuation of the second switch, and to a plurality of other positions in which it permits continuous energization of the first switch and makes adjustment of the temperature setting of the thermostat for determining the temperature at which the thermostat actuates the second switch.

For a better understanding of the invention reference may be had to the accompanying drawing in which:

Fig. 1 is a front view of a control mechanism of the present invention, partially in section, showing the switch control means in one position;

Fig. 2 is a side view of the control of Fig. 1 taken along the line 2—2 of Fig. 1;

Fig. 3 is a view similar to Fig. 1 showing the control mechanism in another operating position;

Fig. 4 is a view similar to Fig. 1 with the control mechanism in still another operating position;

Fig. 5 is a schematic plan view illustrating an air conditioning apparatus having an electrical control system embodying this improved switch or control mechanism;

Fig. 6 is a partial front view showing in greater detail the switch-operating handle together with the cooperating indicator and dial; and Fig. 7 is a front view similar to that shown in Fig. 1 illustrating another embodiment of the present invention.

Referring now to Figs. 1, 2 and 3 there is illustrated the control or switching unit 1 of the present invention and showing schematically the unit connected to a source of electrical power for driving an air circulating means or fan motor 3 and an air cooling means or compressor 2. The control unit comprises a pair of spaced-apart plates to be hereinafter referred to as the mounting plate 4 and the cover plate 4a which are made of some electrical insulating material such as Textolite. A base member 5 is provided between the plates for holding the plates apart and upon which are mounted the various electrical elements of the unit. The mounting plate is provided with means for mounting the unit in an air conditioner, as illustrated schematically in Fig. 5.

Basically the control unit of the present invention comprises a first switch or fan switch 6, a second switch or compressor switch 7, and a room air thermostat 8 all positioned around the control member for operation in a manner to be hereinafter described. In the present embodiment of the invention, the control member comprises a rotatable shaft 9 extending through the mounting plate 4 and the cover plate 4a and having a pair of camming elements 11 and 12 fixedly mounted thereon for rotation with the shaft. According to the function they perform, the camming element 11 is designated the thermostat adjusting cam and the camming element 12 is designated the switch locking cam. A switch operating handle or knob 13 is fixedly attached to the one end of the shaft for rotating the shaft to a plurality of positions in order to obtain the various switching operations.

The operation of the knob 13 to obtain the various conditioning effects can best be understood by referring to Fig. 6 which is a schematic drawing illustrating the escutcheon plate of an air conditioner. When the indicator 14 is in the "off" position the power is interrupted to all the room air conditioner circuits. That is, referring to Fig. 1, switches 6, 7 and 8 are in the open position. Turning the knob 13 clockwise 45° causes the fan to be energized by the closing of the fan switch 6. This position is used for ventilating or exhausting air from or to the conditioned enclosure while the compressor or air cooling means is off. Turning the knob 13 clockwise another 45° causes the room air thermostat 8 to become energized if the controlled space is warm enough. This in turn causes energization of a means for operating the compressor switch 7, and the cooling operation begins. Further rotation of the knob 13 in the clockwise direction sets the position of the room air thermostat 8 so that the room air must be cooler to cause the compressor to turn off. The further the knob 13 is rotated clockwise toward the "cold" position indicated in Fig. 6, the colder the temperature of the enclosure must be in order to cause the compressor to turn off.

To accomplish the above-described operations the present invention provides a simple mechanism which may be easily inserted into the air conditioning apparatus and connected electrically to the various components to be controlled. As can best be seen in Fig. 1, the fan switch 6 comprises a pair of electrical contacts 16 and 17 attached respectively to a stationary blade 18 and a movable blade 19. The opposite end of the stationary blade 18 is mounted in the base member 5 and extends therethrough to form electrical terminal 20 of the control unit to which one of the power line 23 is connected. The movable blade 19 is attached to a terminal 21 extending through the base member 5, the terminal being connected to one lead of the fan motor 3 of the air conditioning apparatus as shown in Fig. 3. The unattached end of the movable blade 19 forms a follower 22 which is positioned such that it may be intercepted by the switch locking cam 12. In order to bias the movable blade 19 towards the switch locking cam 12 and in a direction such that contacts 16 and 17 are closed when the follower 22 is out of contact with the switch locking cam 12, the blade 19 is formed of a spring like or resilient material. Thus as can be seen in Fig. 3 when the shaft 9 has been rotated to the position indicated, or approximately 45°, the cam follower 22 is no longer in contact with the switch locking cam 12 and the contacts 16 and 17 are closed. As can be seen in Fig. 3 when the contacts 16 and 17 are closed, electrical current is supplied from the power line 23 to the terminal 20, through the stationary blade 18 and contacts 16 and 17 and thereby flows to the fan motor through the terminal 21.

The compressor switch 7 comprises a pair of contacts 24 and 25 mounted respectively upon a stationary relay blade 26 and a movable relay blade 27. In order to limit the movement of the movable relay blade 27 in the direction toward the control shaft 9 a backing member 28 is provided which also serves as a mount for the movable relay blade. The stationary relay blade 26 is mounted through the base member 5 and forms the terminal 29 connected to one of the leads to the compressor motor 2 as may be seen in Fig. 3. Another terminal 30 to which the power line 31 is connected is formed by the end of the backing member 28 and a bimetal relay blade 32.

Means associated with the thermostat switch 8 are provided for actuating the contacts 24 and 25 of the compressor switch 7 according to predetermined temperture requirements as determined by the thermostat switch 8. These means include the bimetal blade 32 having a resistance heater 33 wound closely thereon which causes the blade 32 to bend in the direction toward the shaft 9. In order to promote a snap action in the actuation of the compressor switch 7 an over center or toggle spring 34 is mounted between the free end 35 of the movable relay blade 27 and a downwardly extending end 36 of a relay follower member 37 which is mounted upon the free end of the bimetal blade 32. The opposite end 38 of the relay follower 37 extends outwardly toward the control shaft 9 and rides against the switch locking cam 12 when the rotatable shaft 9 is in the position indicated in Figs. 1 and 3. Thus, when the shaft 9 is in the position shown in Figs. 1 and 3, the relay follower 37 prevents the bimetal blade 32 from bending to the right toward the shaft 9, thereby retaining the toggle spring 34 in its overcenter position to the left keeping contacts 24 and 25 in the open position. When the shaft 9 is rotated to the position shown in Fig. 4, or approximately 90°, the cam follower end 38 is free to move to the right toward the control shaft 9. When this is the case, if the heater 33 is supplying heat to the bimetal blade 32, the bimetal blade will bend toward the right and cause the end 36 of the relay follower 37 to move the toggle spring 34 over center to the right thus causing the contacts 24 and 25 to snap shut. As can be seen in Fig. 4 when the contacts 24 and 25 are closed, the circuit leading to the compressor 2 is energized.

In order to control the operation of the compressor switch 7 according to predetermined temperature requirements, as would be desirable in the case of a control unit used in an air conditioning apparatus, the present invention provides a room air thermostat switch 8 in the circuit supplying current to the resistance heater 33, and permits current flow to the resistance heater 33 only during those periods when the operation of the compressor 2 is required. The thermostat 8 includes a pair of contacts 39 and 41 which, when closed, allow current to flow to the resistance heater 33. Contact 41 is mounted upon a temperature sensing element 42 that is responsive to the variable temperature conditions of the enclosure to be conditioned. The temperature sensing element 42 is formed in a U-shape with a pair of legs 43 and 44, one of which (43) is firmly attached to a thermostat mounting member 45 which in turn is embedded in the base member 5. The other leg 44 provides a mount for contact 41. As temperature conditions become colder legs 43 and 44 of the temperature sensing element 42 close together thereby causing the leg 44 to move in a direction away from the control knob 9 thus causing the contact 41 to move toward the right toward the member 45. As the temperature conditions of the enclosure become warmer the temperature sensing element 42 expands and the legs 43 and 44 move apart causing the contact 41 to move toward the left in a direction towards the control shaft 9. A stop 46 is provided which prevents the leg 44 of the temperature sensing element from moving more than a predetermined distance to the left.

After contacts 39 and 41 close it takes a few seconds for the bimetal blade 32 to heat sufficiently to actuate the compressor switch 7. When the temperature sensing element 42 causes the contacts 39 and 41 to open, the heater 33 is de-energized, but a short period of time must elapse for the bimetal blade to cool sufficiently to open the compressor switch 7. This type of action provides a time delay start which makes it easier for the utility company to pick up load after a distribution system failure. It also makes the control relatively insensitive to vibration or shock even though the thermostat sensing element 42 may bounce.

In order to provide a means for adjusting the temperature setting of the thermostat 8 and thereby the temperature at which the compressor switch 7 energizes the circuit to the compressor 2, the contact 39 is affixed to an adjustable thermostat blade 47 which is mounted in the base member 5. As is shown in Fig. 1, the end 48 of this adjustable blade extends downwardly adjacent the stationary fan blade 18 which forms the terminal 20 to which one of the lines 23 of the power circuit is connected. The adjustable thermostat blade 47 is formed of an elongated spring-like material and provided with a reversely bent follower portion 49 which acts as a cam follower and rides against the thermostat adjustment cam 11. The adjustable blade 47 is biased in a direction away from contact with the temperature sensing element 42 and the reversely bent follower portion 49 rides continuously on the thermostat adjustment cam 11. Thus, when the shaft 9 is in the position shown in Figs. 1 and 3 the contacts 39 and 41 cannot possibly be closed due to the combined action of the stop 46 on the leg 44 and the bias of the adjustable blade 47 away from the blade 44. During this portion of the rotation of the shaft 9, or for the first 90° of rotation, the reversely bent follower portion 49 rides on the cam surface 51 of the cam 11. As the cam 11 is rotated the cam surface 51 forces the adjustable blade 47 toward the right until contacts 39 and 41 make connection to complete the circuit to the heater 33. When the thermostat adjustment cam 11 has been rotated approximately 90° the follower portion 49 rides against the elbow 52 of the cam 11 and the adjustable blade is in a position where contact can be made between the contacts 39 and 41 if the temperature conditions are such that the leg 44 of the temperature sensing element 42 is adjacent the stop 46. Current flows through the jumper 53 which leads current from the thermostatic mounting member 45 to a flexible current carrying braid 54 attached to the heater 33 as is illustrated in Fig. 4. Thus when the contacts 39 and 41 are closed current passes upwardly along the adjustable blade through the contacts to the temperature sensing element 42 from where it flows through the thermostat mounting member 45 and across the jumper 53 and into the heater element 33, which transforms the electrical energy into heat causing the bimetal blade 32 to bend toward the control shaft 9. The heater 33 is in electrical contact with the bimetal blade 32, at one end completing the circuit to the power line 31.

Further rotation of the shaft 9 presents the surface 55 to the follower portion 49 and gives a uniform rise to the follower portion during approximately the next 180° of rotation. Thus as the adjustment cam 11 is rotated clockwise, as seen in Fig. 4, the contact 39 on the adjustable blade 47 is forced further and further in the direction toward the leg 44 of the temperature sensing element and the contact 41. Therefore the further the adjustment cam 11 is rotated in the clockwise direction, thus moving the contact 39 closer to the temperature sensing element contact 41, the colder the temperature condition must become before the contacts 39 and 41 will actually separate. The above operation provides a simple means for adjusting the temperature setting of the thermostat to provide a plurality of different temperature positions.

In order to prevent the contacts 39 and 41 from closing and opening during minute changes of temperature which will be sensed by the temperature sensing element 42, and to provide a snap action in the operation of these contacts, there is provided on the adjustable blade 47 a small magnet 56 designed to attract the leg 44 of the temperature sensing element 42 and hold the contacts 39 and 41 closed for a reasonable temperature differential. It is proposed that a temperature differential of 2 to 3 degrees F. would be sufficient to provide proper operation of the compressor for the necessary conditioning requirements. In other words, after contact has been made between contacts 39 and 41 it is necessary for the temperature to decrease 2 or 3 degrees before the temperature sensing element 42 has retracted far enough to cause the leg 44 to overcome the attractive force of the magnet and separate the contacts. The attractive force of the magnet 56 is necessarily very small and the thermostat is very sensitive to changes in room temperature because of the very low contact pressure required to interrupt the low current which energizes the heater 33 for the compressor switch 7.

In order to give the control device a specific "feel" such that the operator is able to tell when a movement of the operating knob has completed a particular operation, a detent spring 57 is mounted upon the mounting plate 4 and contains a portion 58 on the end thereof which extends through the mounting plate 4 and contacts a series of slots or grooves 59 formed in the transverse surface of the thermostat adjustment cam 11. When the control knob is positioned in the "off" position, as indicated in Fig. 1, the portion 58 of the detent spring extends into a slot 59 formed on the transverse face of the cam member 11. By rotating the control knob 45° thereby rotating the control shaft and camming mechanism 45° the portion 58 of the detent spring enters another slot which indicates the fan switch 6 has closed. Rotation of the mechanism clockwise another 45° causes the detent spring to enter still another slot which indicates that the circuit leading to the compressor is in position for energization dependent upon the position of the thermostat member 42. Further rotation of the control knob 13 causes the detent spring to enter a series of serrations 60 spaced approximately 10° apart which gives a "feel" to the control mechanism during the adjustment of the thermostat blade 17.

It is contemplated that the above-described control unit will be used in an air conditioning apparatus for controlling the circuit to the compressor motor 2 and the fan motor 3 of the apparatus. When used in such a device it is necessary to introduce air from the enclosure to be conditioned into the proximity of the temperature sensing element 42 of the thermostat in order to sense the temperature conditions of the air within the enclosure. In order to accomplish this, a plurality of holes 61 have been formed in the mounting plate 4 through which air from the enclosure to be conditioned is passed into the control unit. By mounting the unit as indicated schematically in Fig. 5 of the drawings, air from the conditioned enclosure can enter the control unit through the screen-like control panel 62 in the front of the conditioning apparatus 63. A continuous flow of air from the enclosure passes through the control unit through the screen-like panel 62 and is swept into the air stream entering the unit through the screened inlet opening 64. Thus a supply of air at room temperature conditions is continuously passing over the temperature sensing element of the control unit, which thereby functions accurately according to room temperature conditions.

Referring to Fig. 7 there is shown another embodiment of the present invention in which like elements have been numbered with identical figures as used in the original embodiment of the invention shown in Fig. 1. Sometimes, as is the case when the control unit is used in an air conditioning apparatus such as illustrated in Fig. 3, heat generated by the resistance heater 33 which actuates the bimetal relay blade 32 to operate the compressor switch 7 is not carried off by the air flowing through the control and causes some error in sensing the temperature conditions. That is, air from the enclosure to be conditioned is warmed by the heat from the resistance heater. This air, being slightly warmer than the air within the conditioned enclosure, causes the thermostat to maintain the compressor switch closed longer than needed and might cool the enclosure more than is desired. In the embodiment shown in Fig. 7, a means is provided for insulating a portion of the control containing the resistance heater from the rest of the control unit. A heat insulating barrier 65 isolates the part of the control containing the resistance heater 33 from the remaining portions of the unit. In this assembly the relay follower cam, shown as numeral 38 in Fig. 1 is omitted. It is conceivable that such a follower could be provided which would extend through a slot formed in the heat insulating barrier 65. The omission of the cam follower 38 has the following effect. When the control shaft is rotated into one of the positions so that contacts 39 and 41 may be closed and the heater 33 energized, and it is suddenly desirable, for one reason or another, to turn the entire unit off, it is no longer possible to force the bimetal relay blade 32 into a position wherein the contacts 24 and 25 are opened. In other words, it is necessary in this embodiment to wait until the bimetal relay blade 32 cools sufficiently to move in a direction away from the control shaft 9 before the contacts 24 and 25 will be snapped open. In order to disconnect the power to both the fan 3 and the compressor 2 when using this embodiment of the invention, it is necessary to wire the control unit slightly differently and to increase the size of contacts 16—17. As can be seen in Fig. 7, the power line 23 is connected to the movable fan blade terminal 21 rather than the stationary fan blade 20. The fan 3 is then connected directly between the terminals 30 and 20 instead of between terminals 30 and 21 as is the case in the first embodiment of the invention illustrated in Fig. 1. The compressor is connected between terminals 29 and 20 as was the case previously, in the embodiment illustrated in Fig. 1. By making the above electrical connections the fan switch 6 operates as main switch to the apparatus and makes or breaks all the circuits within the apparatus.

In operation, this embodiment is very similar to the first except for the above described inability to force the compressor switch into the open position. Thus as the control knob is rotated 45° from the first position contacts 16 and 17 close thereby energizing the fan circuit. In this position with contacts 16 and 17 closed, the compressor circuit is also placed in condition for energization but will not become energized until the thermostat switch 8 provides current to the heater 33 thus causing the actuation of the compressor switch contacts. As the control knob is rotated another 45°, the follower portion 49 sets contacts 41 and 39 in position to close if the enclosure temperature is high enough, thereby energizing the heater 33. Further rotation of the control knob permits the temperature adjustment of the thermostat switch 8 as provided by the temperature adjustment cam 11. When turning the control knob counterclockwise the operation of the various switches is in the reverse. However, a period of time must elapse after the contacts 39 and 41 open before the bimetal blade 32 has cooled sufficiently to snap the contacts 25 and 26 into the open position. After once opening the main switch or fan switch 6, if sufficient time has not elapsed for the bimetal blade 32 to cool, and the main switch 6 is again closed, both the circuits leading to the fan and the compressor will be energized simultaneously.

By the present invention there has been provided an improved control mechanism for effecting the operation of a pair of electrical switches with a single control member and also provides for adjustment of the temperature setting of a thermostat member with the same control member. Moreover, this invention provides a particularly sensitive thermostat arrangement for actuating one of the above switches according to a variable temperature condition.

While in accordance with the patent statutes there has been described what at present are considered to be the preferred embodiments of the invention, it will be obvious to those skilled in the art that various changes and modifications may be made therein without departing from the invention and it is therefore the intent of the appended claims to cover all such changes and modifications as fall within the true spirit and scope of the invention.

What we claim as new and desire to secure by Letters Patent of the United States is:

1. A switch mechanism for selectively energizing two separate electrical circuits comprising a first switch for energizing one of said electrical circuits, a second switch for energizing said second electrical circuit, a bimetal blade arranged to actuate said second switch into the closed position, a resistance heater for said bimetal blade, said heater being arranged to cause movement of said bimetal blade to close said second switch when said heater is energized, a thermostat including a temperature sensing element movable in response to a variable temperature condition for energizing said resistance heater, said variable temperature condition being one caused by a source other than heat of said resistance heater, a control member selectively movable from an off position to a plurality of positions for first actuating said first switch and for then adjusting said thermostat to determine the temperature at which said temperature sensing element energizes said resistance heater.

2. A switch mechanism for selectively energizing two separate electrical circuits comprising a first switch for energizing one of said electrical circuits, a second switch for energizing said second electrical circuit, a bimetal blade arranged to operate said second switch, a resistance heater for said bimetal blade, energization of said heater causing movement of said bimetal blade to operate said second switch, a thermostat including a temperature sensing element movable in response to a variable temperature condition for energizing said resistance heater, a control member selectively movable from an off position to a plurality of positions, means operable in response to positioning of said control member to the off position for opening said first circuit and preventing said bimetal blade from closing said second switch, means operable in response to positioning of said control member to a first of said selective positions for closing said first switch and for preventing said bimetal relay from closing said second switch, means operable in response to positioning of said controlling element to a second of said selective positions for effecting continuous energization of said first switch and for placing said bimetal blade in condition for energization, and means operable in response to positioning of said control member through the remainder of said selective positions for adjusting the temperature setting of said thermostat whereby energization of said heater is effected by said thermostat according to requirements of said variable temperature condition thereby providing operation of said second switch.

3. A switch mechanism for selectively energizing two separate electrical circuits comprising a first switch for energizing one of said electrical circuits, a second switch for energizing said second electrical circuit, a bimetal blade arranged to operate said second switch, a resistance heater for said bimetal blade, a thermostat including a temperature sensing element movable in response to a variable temperature condition, a third switch operable upon movement of said temperature sensing element, said third switch when in the closed position energizing said heater to cause movement of said bimetal blade to operate said second switch, a rotatable control shaft movable from an off position to a plurality of selective positions, a first camming element on said shaft designed to engage said first and second switches during at least a portion of said rotation of said shaft, said first camming element opening said first switch and preventing said second switch from closing when said rotary shaft is positioned in said off position, said first camming element permitting said first switch to close and maintaining said second switch open when said shaft is positioned in a first of said selective positions, said first camming elements permitting said first switch to close and permitting said second switch to close when said control shaft is positioned in the remaining of said selective positions, a second camming element on said shaft designed to cam said third switch into position for actuation by said temperature sensing element of said thermostat when said control shaft is positioned in said remaining of said selective positions, said second camming element also designed to provide adjustment of said thermostat to a plurality of graduated positions when said control shaft is rotated through said remaining selective positions.

References Cited in the file of this patent
UNITED STATES PATENTS

| 2,172,189 | Clark | Sept. 5, 1939 |
| 2,498,127 | Kuhn | Feb. 21, 1950 |
| 2,544,592 | Feinberg | Mar. 6, 1951 |